No. 640,932. Patented Jan. 9, 1900.
J. J. OBER.
GATE HINGE.
(Application filed May 4, 1899.)
(No Model.) 2 Sheets—Sheet 1.
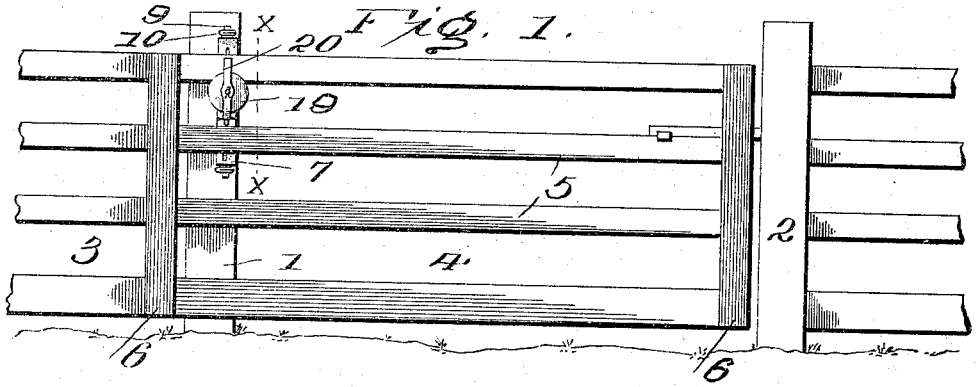
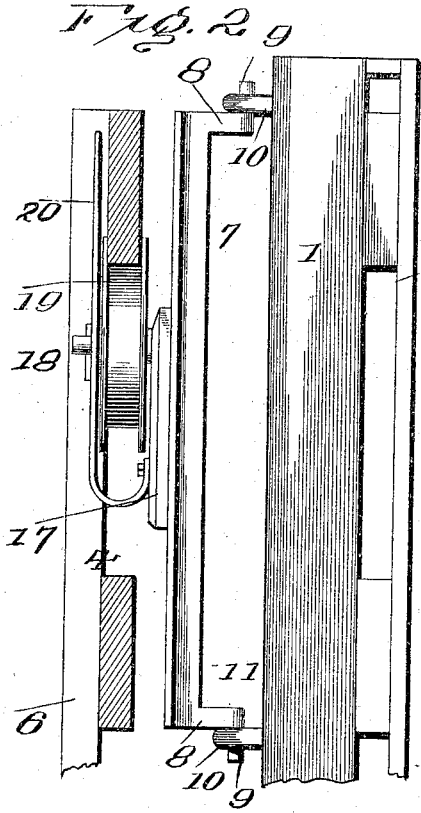 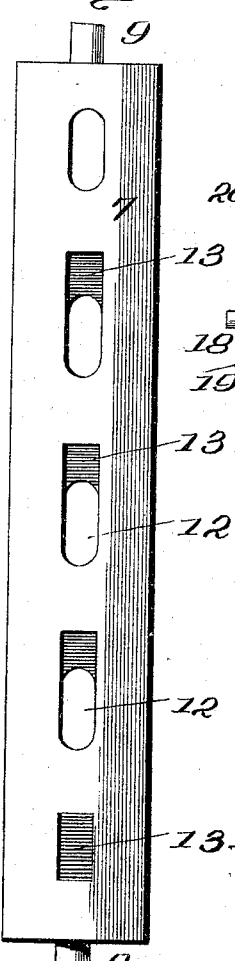 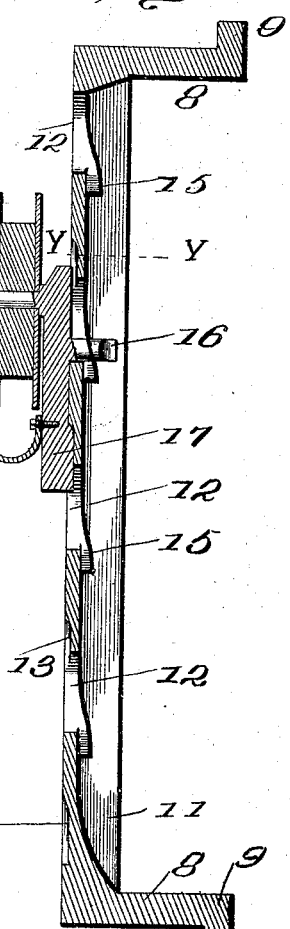
Witnesses Inventor.
John J. Ober.
his Attorneys No. 640,932. Patented Jan. 9, 1900.
J. J. OBER.
GATE HINGE.
(Application filed May 4, 1899.)
(No Model.) 2 Sheets—Sheet 2.
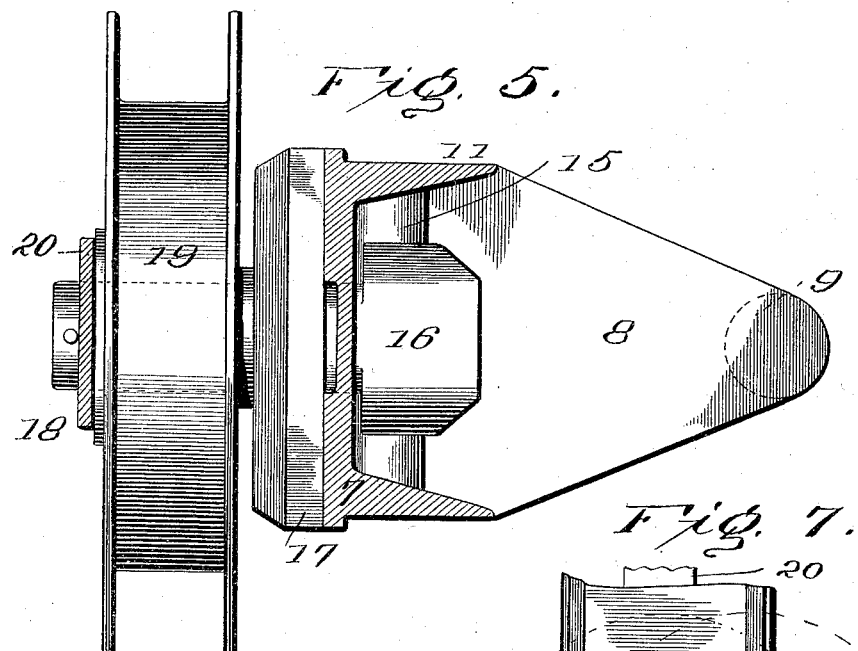
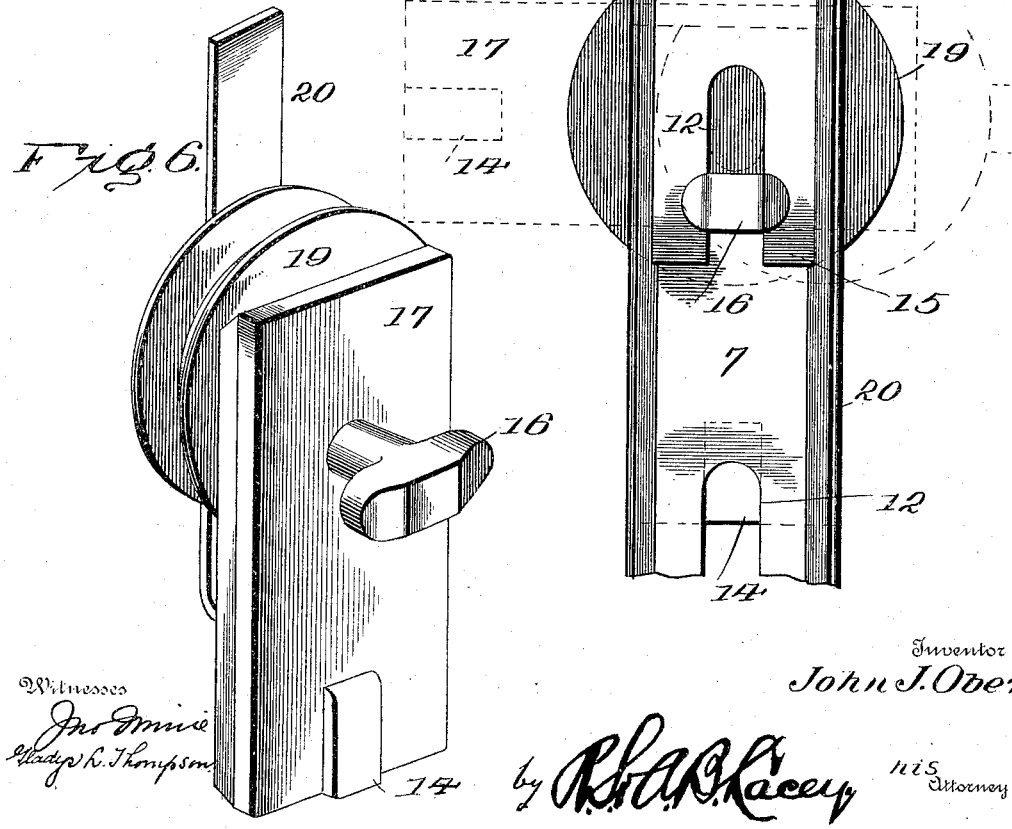
Inventor
John J. Ober

UNITED STATES PATENT OFFICE.

JOHN J. OBER, OF KIBBEY, MONTANA.

GATE-HINGE.

SPECIFICATION forming part of Letters Patent No. 640,932, dated January 9, 1900.

Application filed May 4, 1899. Serial No. 715,592. (No model.)

*To all whom it may concern:*

Be it known that I, JOHN J. OBER, a citizen of the United States, residing at Kibbey, in the county of Cascade and State of Montana, have invented certain new and useful Improvements in Gate-Hinges; and I do hereby declare the following to be a full, clear, and exact description of the invention, such as will enable others skilled in the art to which it appertains to make and use the same.

It is desirable in many instances to adjust farm-gates vertically to vary the distance between their lower edge and the surface of the ground over which the gate swings, so as to clear snow-drifts, avoid weeds and other growths, separate stock, allow for settling, and provide for contingencies necessitating a raising or lowering of the gate.

The invention provides a simple and effective hinge which will admit of the gate being moved to a relatively higher or lower level, as may be required, the adjustment being accomplished without the use of tools or implements of any kind.

The invention consists, primarily, of a hinge-bar, a bracket forming a support for the gate, an interlocking projection and slot forming an adjustable connection between the hinge-bar and bracket and coöperating by a relatively-sliding movement, and a fixed cam adapted to act jointly with the interlocking projection to automatically draw the parts together simultaneously with their relative sliding movement when coupling them.

The invention further consists of the hinge-bar having a series of longitudinal slots or openings elongated lengthwise of the bar, projections applied to the bracket to coöperate with the said slots, one of the projections having a T-head to sit crosswise of the slots and hold the bracket in place, and cam portions to draw the bracket close against the hinge-bar.

The invention also consists of the novel features, details of construction, and combinations of the parts which hereinafter will be more fully described, illustrated, and claimed.

In adapting the invention to meet the many cases for which it is susceptible and capable of advantageous use it is to be understood that various changes in the form, proportion, and minor details of construction may be resorted to without departing from the spirit of the invention or sacrificing any of the advantages thereof.

In the drawings, Figure 1 is a front view of a gate, showing the application of the invention. Fig. 2 is a cross-section on the line X X of Fig. 1. Fig. 3 is a front view of the hinge-bar. Fig. 4 is a vertical central section of the hinge-bar, showing the bracket in position. Fig. 5 is a plan section of the hinge on the line Y Y of Fig. 4. Fig. 6 is a perspective view of the bracket. Fig. 7 is a detail view of a portion of the hinge-bar as seen from the rear, showing the position of the bracket by dotted lines when turned to bring the interlocking T projection in register with the slot of the hinge-bar, so as to pass therethrough, the full lines indicating the position of the bracket when interlocking with the hinge-bar.

Corresponding and like parts are referred to in the following description and indicated in all the views of the drawings by the same reference characters.

The hinge-post 1 and the latch-post 2 are disposed on opposite sides of the opening in the fence 3, closed by the gate 4, which is formed of longitudinal strips 5 and end battens 6, firmly attached to the strips at their ends.

The hinge-bar 7 is provided at its ends with offstanding portions 8 and vertical pintles 9, which enter hinge-eyes 10, applied to the post 1, and which hinge-eyes may be provided in any of the usual ways. The hinge-bar 7 is preferably cast and is reinforced at its longitudinal edges by means of rearwardly-extending flanges 11 and is provided at intervals in its length with elongated openings or longitudinal slots 12. Depressions 13 are formed in the outer face of the hinge-bar and receive the projection 14 of the bracket carrying the flanged roller. These depressions 13 communicate with an end of the slots 12. Inclined or cam portions 15 are provided at the sides of the longitudinal slots or elongated openings 12 and act in the manner of wedges against the lateral extensions of the T projection 16, so as to draw the bracket close against the face of the hinge-bar. The component parts of the hinge-bar are integral therewith, thereby obviating the formation of joints and resulting in the provision of a substantially durable and cheaply-constructed device for the purpose designed.

The bracket 17 is formed with or has applied thereto the T projection 16 and the straight projection or lug 14, which are adapted to coöperate with any one of the slots 12 and the depression 13 adjacent thereto. A journal 18 projects outwardly from the upper portion of the bracket and receives the flanged roller 19. A guard 20 is attached at its lower end to the bracket 17 and curves upwardly and receives the outer end of the journal 18 and projects above the upper portion of the flanged roller, so as to overlap the strip or bar of the gate resting directly upon the roller, thereby preventing displacement of the gate. The T projection 16 has its neck portion of a diametrical extent corresponding to the width of the slots 17, so as to touch the sides of said slots and prevent any lateral play of the bracket when in position. The head portion of the projection 16 is adapted to pass through any one of the slots 12 and to be turned so as to sit crosswise thereof and engage with the hinge-bar upon opposite sides of said slots and prevent outward displacement of the bracket. The lateral extensions of the interlocking projection 16 are inclined in conformity to the cam portions 15, so as to secure an extended contact therewith.

When placing the bracket in position, it is turned at right angles to the length of the hinge-bar, so as to permit the interlocking projection 16 to pass readily through the required slot, after which the bracket is turned into parallel relation with the hinge-bar, whereby the head of the projection 16 interlocks with the hinge-bar upon opposite sides of the slot or opening through which it has been passed. The bracket is released, and gravitation causes the lateral extensions of the interlocking projection 16 to ride upon the cam portions 15, whereby the bracket is drawn close against the face of the hinge-bar. The depression 13 immediately below the slot receiving the interlocking projection 16 receives the straight projection or lug 14, which serves to prevent any lateral movement of the bracket at its lower end. When it is required to shift the position of the bracket, either to raise or to lower it, the bracket is elevated, so as to disengage the lateral extensions of the interlocking projection 16 from the cam portions 15, whereby the lower end of the bracket can be swung outward to disengage the projection 14 from the hinge-bar, after which the bracket is turned at right angles to the length of the hinge member to permit the interlocking projection 16 to be withdrawn from the engaging slot. The bracket is engaged with the required slot of the hinge-bar by a repetition of the operation previously described. The hinge is exceedingly simple and involves a substantial structure and admits of the gate being supported at the required elevation either to clear snowdrifts or weeds or to permit of small stock passing beneath it. An upward movement of the gate will not displace it from the hinge. Hence stock passing beneath the gate cannot displace or dislodge the gate from its hinge connection with the post 1.

Having thus described the invention, what is claimed as new is—

1. The combination with the hinge-bar, and the bracket forming a direct support for the gate, of an adjustable connection between the hinge-bar and bracket-support consisting of an interlocking projection and slot, the coupling being effected by a relatively-sliding movement of the parts, and a fixed cam coöperating with the interlocking projection to automatically draw the parts together simultaneously with their relative sliding movement when coupling them, substantially as set forth.

2. The combination with a hinge-bar having a series of longitudinal slots at intervals in its length, of a bracket bearing a roller and provided with an interlocking projection of T form and a second projection at a distance from the interlocking projection to engage with the hinge-bar and prevent lateral movement of the bracket when adjusted, substantially as set forth.

3. The combination with a hinge-bar provided with a series of longitudinal slots, of a bracket bearing a roller and having an interlocking projection of T form, and cam or inclined portions juxtaposed to said slots and adapted to coöperate with said interlocking projection, as and for the purpose set forth.

4. A hinge-bar having a series of longitudinal slots in its length and provided upon its rear side with inclined or cam portions at the sides of said slots, and a bracket forming a support for the gate and provided with an interlocking projection of approximately T form to pass through any one of the series of slots and ride upon the inclined or cam portions adjacent thereto, substantially as specified.

5. The combination with a hinge-bar having a series of longitudinal slots at intervals in its length and provided upon its rear side with inclined or cam portions at the sides of the slots and provided with depressions in its face, of a bracket forming a support for the gate and provided with an interlocking projection of approximately T form to coöperate with the slots and cam portions, and having a straight projection or lug to enter the required depression, as and for the purpose set forth.

In testimony whereof I affix my signature in presence of two witnesses.

JOHN J. OBER.

Witnesses:
 EUGENE PRIOR,
 R. E. WILLIAMS.